(12) United States Patent
Li et al.

(10) Patent No.: US 12,731,910 B2
(45) Date of Patent: Sep. 8, 2026

(54) ANTENNA, DETECTION APPARATUS, AND TERMINAL

(71) Applicant: Yinwang Intelligent Technologies Co., Ltd., Shenzhen (CN)

(72) Inventors: Haowei Li, Shenzhen (CN); Xiang Gao, Xi'an (CN); Jie Peng, Shanghai (CN); Paolo Rocca, Trento (IT); Marco Salucci, Trento (IT)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 167 days.

(21) Appl. No.: 18/673,626

(22) Filed: May 24, 2024

(65) Prior Publication Data

US 2024/0313425 A1 Sep. 19, 2024

Related U.S. Application Data

(63) Continuation of application No. PCT/CN2021/133593, filed on Nov. 26, 2021.

(51) Int. Cl.

*H01Q 1/38* (2006.01)
*G01S 13/08* (2006.01)
*H01Q 21/20* (2006.01)

(52) U.S. Cl.

CPC ............. *H01Q 21/20* (2013.01); *G01S 13/08* (2013.01); *H01Q 1/38* (2013.01)

(58) Field of Classification Search

CPC ........ H01Q 21/20; H01Q 1/38; H01Q 21/068; H01Q 11/02; H01Q 1/3233; H01Q 21/08; G01S 13/08; G01S 7/03

See application file for complete search history.

(56) References Cited

U.S. PATENT DOCUMENTS

| | | | |
|---|---|---|---|
| 4,335,385 A | 6/1982 | Hall | |
| 9,831,559 B2 | 11/2017 | West et al. | |
| 2024/0222853 A1* | 7/2024 | Moss .................. | H01Q 1/2283 |

FOREIGN PATENT DOCUMENTS

| | | |
|---|---|---|
| CN | 104064876 A | 9/2014 |
| CN | 106611898 A | 5/2017 |
| CN | 106911011 A | 6/2017 |
| CN | 210379423 U | 4/2020 |
| CN | 211455943 U | 9/2020 |

(Continued)

*Primary Examiner* — David E Lotter

(74) *Attorney, Agent, or Firm* — WOMBLE BOND DICKINSON (US) LLP

(57) ABSTRACT

Embodiments of this application provide an antenna, an antenna array, a detection apparatus, and a terminal. According to the antenna provided in this application, the antenna includes a plurality of radiating elements, the plurality of radiating elements are sequentially connected, and an included angle between adjacent radiating elements is greater than 0° and less than 180°. In this way, the plurality of radiating elements form a broken-line structure (a broken-line antenna) or a curve structure (a curved antenna), and the plurality of radiating elements include a first radiating element. In a first direction, along a first side of the first radiating element, that is, from the first radiating element to a first end of the antenna, widths of radiating elements in the plurality of radiating elements gradually decrease. Therefore, low side lobes at the first end of the antenna can be implemented.

20 Claims, 8 Drawing Sheets

(56) References Cited

FOREIGN PATENT DOCUMENTS

| | | | |
|---|---|---|---|
| CN | 112106256 | A | 12/2020 |
| CN | 214754187 | U | 11/2021 |
| KR | 101664389 | B1 | 10/2016 |
| KR | 20170056230 | A | 5/2017 |

* cited by examiner

ANTENNA, DETECTION APPARATUS, AND TERMINAL

CROSS-REFERENCE TO RELATED APPLICATIONS

This application is a continuation of International Application No. PCT/CN2021/133593, filed on Nov. 26, 2021, the disclosure of which is hereby incorporated by reference in its entirety.

TECHNICAL FIELD

This application relates to the field of antenna technologies, and specifically, to an antenna, a detection apparatus, and a terminal.

BACKGROUND

As wireless technologies develop, more electronic products need to use antennas to receive and send signals. A microstrip antenna has advantages of small size, light weight, low profile, and the like, and is widely used in the communication field, the radar field, and the like.

As various electronic products have increasingly high requirements on antenna performance, how to design a high-performance antenna like a broadband and low side lobe antenna becomes an urgent problem to be resolved.

SUMMARY

An embodiment of this application provides an antenna, to improve radiation performance of the antenna. The antenna has characteristics of low side lobes, a broadband, and a small size. The antenna is used in a detection apparatus or a terminal, so that a detection capability of the detection apparatus or a sensing capability of the terminal can be improved.

An embodiment of this application provides an antenna. The antenna includes a plurality of radiating elements, and the plurality of radiating elements are sequentially connected. In other words, the antenna includes a plurality of sequentially connected radiating elements. Two adjacent radiating elements in the plurality of radiating elements are connected end to end, and an included angle between the adjacent radiating elements is greater than 0° and less than 180°. The plurality of radiating elements include a second radiating element and a first radiating element. In a first direction, the second radiating element is located on a first side of the first radiating element, and a width of the first radiating element is greater than a width of the second radiating element.

It can be learned that in the antenna provided in this embodiment of this application, the plurality of radiating elements are sequentially connected, and the included angle between the adjacent radiating elements is greater than 0° and less than 180°, to form a broken-line structure (a broken-line antenna) or a curved structure (a curved antenna). In addition, widths of radiating elements gradually decrease from one end of the antenna to the other end of the antenna, so that miniaturization of the antenna and single-end (side) low side lobes are implemented.

In an embodiment, the plurality of radiating elements further include a third radiating element. In the first direction, the third radiating element is located on a second side of the first radiating element, and the width of the first radiating element is greater than a width of the third radiating element.

It can be learned that widths of the radiating elements gradually decrease from the middle (not required to be a middle position) of the antenna to both ends of the antenna. This implements miniaturization of the antenna and low side lobes at both the ends (sides).

An embodiment of this application provides an antenna. The antenna includes a plurality of radiating elements, the plurality of radiating elements are sequentially connected, and an included angle between adjacent radiating elements is greater than 0° and less than 180°. In this way, the plurality of radiating elements form a broken-line structure (a broken-line antenna) or a curve structure (a curved antenna), and the plurality of radiating elements include a first radiating element. In a first direction, along a first side of the first radiating element, that is, from the first radiating element to a first end of the antenna, widths of radiating elements in the plurality of radiating elements gradually decrease. Therefore, low side lobes at the first end of the antenna can be implemented. Alternatively, in the first direction, along a second side of the first radiating element, that is, from the first radiating element to a second end of the antenna, widths of radiating elements in the plurality of radiating elements gradually decrease. Therefore, low side lobes at the second end of the antenna can be implemented. Radiating elements along the first side of the first radiating element may include the foregoing second radiating element, and radiating elements along the second side of the first radiating element may include the foregoing third radiating element.

For example, the curved antenna provided in this embodiment of this application may be designed according to one or more of the following functions: Bessel functions, an Archimedes spiral function, an elliptic function, an S-shaped curve function, a trigonometric function, an inverse trigonometric function, a Nike function, a logarithmic function, a curve of a least squares method, an exponential function, a power function, a parabolic function, a hyperbolic function, a polynomial function, or the like. When the curved antenna is designed according to the polynomial function, the curved antenna may be specifically obtained through fitting according to a binomial function, or may be obtained through fitting according to other polynomial functions. The broken-line antenna provided in this embodiment of this application may be understood as a special example of the curved antenna. It can be learned that the curved antenna or the broken-line antenna provided in this embodiment of this application may be implemented according to the functions provided above. For example, widths of a plurality of radiating elements of the broken-line antenna may be distributed in a shape of a cone pin or in a shape that is like a cone pin.

In some embodiments, the second radiating element and the first radiating element are connected through at least one radiating element, that is, it is considered that the second radiating element and the first radiating element are indirectly connected. In an embodiment, in the first direction, widths from the second radiating element to the first radiating element gradually increase. That is, widths of radiating elements gradually increase from a radiating element at one end of the antenna to a radiating element at the other end of the antenna, to implement low side lobes at one end of the antenna.

In some embodiments, the plurality of radiating elements further include a third radiating element. In the first direction, the third radiating element is located on the second side of the first radiating element. A width of the first radiating element is greater than a width of the third radiating element. In an embodiment, the first radiating element and the third radiating element are connected through at least one radiating element, that is, it is considered that the first radiating element and the third radiating element are indirectly connected. In an embodiment, in the first direction, widths of radiating elements gradually decrease from the first radiating element of the antenna to the first side and the second side. It may be understood that, widths of radiating elements gradually decrease from a radiating element near the middle of the antenna to both ends of the antenna. Therefore, low side lobes at both the ends of the antenna are implemented, miniaturization of the antenna is implemented, and a wide beam characteristic of the antenna in a direction perpendicular to the first direction is implemented.

In some embodiments, a width of a single radiating element may be represented by a maximum width, a minimum width, or an average width of a radiating element, or may be represented by a width corresponding to any position of a radiating element, or the like. For example, a width of a radiating element in the plurality of radiating elements is a width at a same reference position, for example, a width corresponding to a half of each radiating element, or may be a width at another same reference position. This is not limited in this embodiment of this application.

In some embodiments, the first radiating element may be a radiating element with a largest width in the plurality of radiating elements, the second radiating element may be a radiating element with a smallest width in the radiating elements on one side of the first radiating element, and the third radiating element may be a radiating element with a smallest width in the radiating elements on the other side of the first radiating element. A width of the second radiating element may be equal to or not equal to the width of the third radiating element.

In some embodiments, a fourth radiating element is included between the second radiating element and the first radiating element, and a width of the fourth radiating element is the same as the width of the first radiating element; and/or a fourth radiating element is included between the first radiating element and the third radiating element, and a width of the fourth radiating element is the same as the width of the first radiating element. Widths of the two radiating elements described in this embodiment of this application are the same. When shapes of the two radiating elements are different, it may be understood that maximum widths of the two radiating elements are the same. In an embodiment, when shapes of the two radiating elements are the same, it may be understood that widths at corresponding positions of the two radiating elements are the same. In an embodiment, the antenna may include a plurality of fourth radiating elements.

In some embodiments, in addition to the fourth radiating element, a first quantity of radiating elements included between the second radiating element and the first radiating element is the same as a second quantity of radiating elements included between the first radiating element and the third radiating element or a difference between the first quantity of radiating elements included between the second radiating element and the first radiating element and the second quantity of radiating elements included between the first radiating element and the third radiating element is 1. The antenna provided in this embodiment of this application may include an odd quantity of radiating elements or an even quantity of radiating elements.

In some embodiments, in addition to the fourth radiating element, a width of a radiating element between the second radiating element and the first radiating element is greater than or equal to the width of the second radiating element and less than the width of the first radiating element; and/or a width of a radiating element between the first radiating element and the third radiating element is greater than or equal to the width of the third radiating element and is less than the width of the first radiating element. In this way, widths of the radiating elements decrease from the first radiating element to the second radiating element of the antenna. This implements low side lobes on a single side of the antenna. Alternatively, widths of the radiating elements decrease from the first radiating element to the second radiating element of the antenna and from the first radiating element to the third radiating element of the antenna. This implements low side lobes on both sides of the antenna.

In some embodiments, in the first direction, along the first side of the first radiating element, widths of radiating elements in the plurality of radiating elements gradually decrease, or in the first direction, along the second side of the first radiating element, widths of radiating elements in the plurality of radiating elements gradually decrease. That is, from one end to the other end of the antenna, widths of the radiating elements gradually decrease (or gradually increase), to implement low side lobes on a single side of the antenna. Alternatively, in the first direction, along the second side of the first radiating element, widths of radiating elements in the plurality of radiating elements gradually decrease, to implement low side lobes on both sides of the antenna. It may be understood that, from one end to the other end of the antenna, widths of the radiating elements gradually decrease (or gradually increase), and then from the other end to the one end of the antenna, widths of the radiating elements gradually increase (or gradually decrease).

In some embodiments, gradually decreasing widths of radiating elements refers to a trend of decreasing widths, and may decrease one by one. For example, widths of radiating elements of an antenna are distributed in a shape of a cone pin. Alternatively, widths of radiating elements of an antenna may decrease by group. For example, widths of the radiating elements of an antenna are distributed in a shape that is like a cone pin. For example, one side or both sides of the first radiating element include N groups of radiating elements, each group of radiating elements has a same width, and widths of radiating elements between groups are different. In addition, in a direction from the first radiating element to one side or both sides of the first radiating element, widths of radiating elements decrease by group, and quantities of radiating elements between groups are the same or different. Alternatively, in a direction from the first radiating element to one side or both sides of the first radiating element, widths of the radiating elements may slightly increase and then decrease, provided that a decreasing trend of an overall width of the antenna is not affected. For example, when side lobes on a single side of the antenna are low, the second radiating element may be located on a device side of the radiating element of the antenna, or may be located on a secondary device side. Although a width of the radiating element on the device side is slightly greater than that of the second radiating element, a trend of decreasing widths may also be implemented, to implement low side lobes of the antenna. For another example, when side lobes on both sides of the antenna are low, the second radiating element and the third radiating element may be located on a device side of the radiating element of the antenna, or may be located on a secondary device side. Although a width of the radiating element on the device side is slightly greater than that of the second radiating element and the third radiating element, a trend of decreasing widths may also be implemented, to implement low side lobes of the antenna.

In some embodiments, a maximum width of a radiating element in the plurality of radiating elements is less than or equal to 0.5 times an operating wavelength. The operating wavelength in this embodiment of this application may be a central operating wavelength of the antenna or an operating wavelength corresponding to any frequency in an operating band of the antenna.

According to a second aspect, an antenna array is provided. The antenna array includes the antenna in the first aspect or any possible implementation of the first aspect.

In some embodiments, the antenna array further includes a power dividing and combining circuit. The power dividing and combining circuit includes a first power-dividing end and a second power-dividing end that are respectively electrically connected to a first antenna and a second antenna in a plurality of antennas.

In this way, a signal received on the first antenna and a signal received on the second antenna can be combined to a power-combining end of the power dividing and combining circuit. Alternatively, a signal transmitted at the power-combining end of the power dividing and combining circuit may be split to the first antenna and the second antenna. In this way, a feeding network feeds the antenna array in one-drive-two mode.

In an embodiment, the power dividing and combining structure may alternatively be a one-to-many or all-in-one power dividing and combining structure, so that the feeding network feeds the antenna array in one-drive-many or all-in-one mode.

It can be learned that the antenna array provided in this embodiment of this application can implement an array with a characteristic like broadband impedance matching, and effects such as wide beam, and low side lobe.

According to a third aspect, a detection apparatus is provided. The detection apparatus includes a radio frequency circuit and the antenna array according to the second aspect or any possible implementations of the second aspect. The antenna array is configured to receive or send a signal; and the radio frequency circuit is configured to process the signal.

In some embodiments, the detection apparatus may be a radar.

In some embodiments, the detection apparatus may further include a protective cover. The protective cover is configured to protect the antenna and/or the radio frequency circuit, for example, to protect the antenna and/or the radio frequency circuit from dust and water.

It can be learned that the detection apparatus including the antenna and/or the antenna array provided in this embodiment of this application may have higher distance resolution.

According to a fourth aspect, a terminal is provided, and the terminal includes the detection apparatus according to the third aspect. Further, the terminal may be an intelligent transportation device, an intelligent manufacturing device, a smart home device, mapping equipment, or the like.

In some embodiments, the terminal is a vehicle.

It can be learned that the vehicle including the detection apparatus provided in this embodiment of this application may have a higher sensing capability.

DESCRIPTION OF EMBODIMENTS

The following describes in detail embodiments of this application with reference to accompanying drawings.

An embodiment of this application provides an antenna structure. The antenna structure can provide better radiation performance, for example, low side lobes. When the antenna structure is used in a detection device, a sensing capability of the detection device can be improved.

Figure 1:
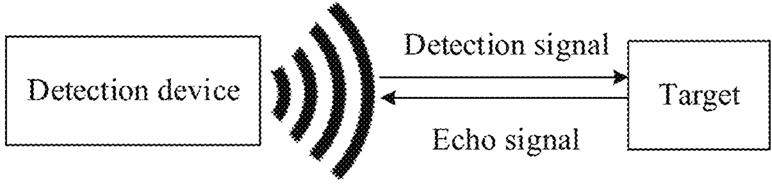
FIG. 1 is a schematic diagram of a structure of an application scenario according to an embodiment of this application.

FIG. 1 is a schematic diagram of an application scenario of an antenna according to an embodiment of this application. A detection device transmits a detection signal through an antenna, and receives an echo signal of the detection signal through the antenna. The echo signal is a signal obtained through reflection of the detection signal by a target detection object. The detection device may perform target detection based on the echo signal, for example, perform ranging, velocity measurement, or positioning on the target detection object.

The detection device may be used in a plurality of scenarios such as an intelligent vehicle, an uncrewed aerial vehicle, intelligent transportation, and industrial automation.

The antenna provided in this embodiment of this application may be used in the detection device, to improve a detection capability of the detection device. Alternatively, the antenna is used in a terminal device, to improve a receiving and sending capability or a sensing capability of the terminal device. In an embodiment, the detection device may be used in the terminal device.

The detection device in this embodiment of this application may be a radar (for example, a millimeter-wave radar), a lidar, an ultrasonic radar, or the like.

Radar is derived from abbreviation of “radio detection and ranging”, meaning “radio detection and ranging”. The radar uses radio to discover a target and determine a spatial location of the target.

A detection medium of the radar is an electromagnetic wave, and the radar implements ranging, velocity measurement, azimuth measurement, and the like of a target by sending the electromagnetic wave and receiving an echo wave (namely, an electromagnetic wave reflected from the target) of the electromagnetic wave. The radar can perform ranging on the target based on flight time of the electromagnetic wave. The flight time is a time difference between receiving time and sending time of the electromagnetic wave. The radar transmits the electromagnetic wave and receives the echo wave of the electromagnetic wave. The radar can perform ranging on the target based on the time difference between receiving time and transmitting time of the electromagnetic wave and a propagation velocity of the electromagnetic wave. A distance between the radar and the target may be determined according to the following formula: $s=c*t/2$, where s is the distance from the target; t is flight time, namely, time from time at which the electromagnetic wave is transmitted from the radar to time at which the echo wave from the target is received; and c is a velocity of light. The radar implements velocity measurement of the target based on Doppler effect. A principle of the Doppler effect is as follows: When a vibration source like a sound, light, or a radio wave moves relative to an observer at a relative velocity, a frequency of vibration received by the observer is different from a frequency of the vibration source. When the electromagnetic wave transmitted by the radar moves relative to a detected target, a frequency of an echo wave is different from that of a transmitted wave. When the target approaches the radar of the antenna, a frequency of the echo wave is higher than that of the transmitted wave. Conversely, when the target is far away from the radar of the antenna, a frequency of the echo wave is lower than that of the transmitted wave. A frequency change caused by the Doppler effect is called Doppler frequency shift, which is proportional to a relative velocity and inversely proportional to a vibration frequency. Therefore, by detecting a frequency difference between the transmitted wave and the echo wave, a moving velocity of the target relative to the radar can be measured, namely, a relative velocity of the target relative to the radar. The radar may measure an azimuth through an amplitude method, a phase method, or the like. The amplitude method is used to measure an angle by using an amplitude value of an echo signal received by the antenna, and a change rule of the amplitude value depends on a pattern of the antenna and an antenna scanning manner. The phase method is used to measure an angle by using a phase difference between echo signals received by a plurality of antenna elements. For example, the radar receives, through an antenna array, echo waves reflected by a same target, and calculates an azimuth of the target based on a phase difference of echo signals.

A detection medium of a millimeter-wave radar is an electromagnetic wave within a wavelength range, for example, a microwave. Currently, a millimeter wave and a centimeter wave (for example, a centimeter wave in a 24 GHz frequency band) adjacent to a millimeter wave band are commonly used. The millimeter wave is an electromagnetic wave with a wavelength of 1 millimeter to 10 millimeters (mm), and a wavelength of an electromagnetic wave in the 24 GHz frequency band is slightly greater than 10 mm. Because a wavelength of the detection medium of the millimeter-wave radar is in an overlapped wavelength range of the microwave and a far infrared wave, the wavelength has characteristics of two kinds of spectrum. According to a wave propagation theory, a higher frequency indicates a shorter wavelength, higher resolution, and a stronger penetration capability, but a greater loss and shorter transmission distance during propagation. Correspondingly, a lower frequency indicates a longer wavelength, a stronger diffraction capability, and a longer transmission distance. Therefore, compared with the microwave, the detection medium of the millimeter-wave radar has high resolution, good directivity, a strong anti-interference capability, and good detection performance. Compared with the infrared, the detection medium of the millimeter-wave radar has less atmospheric attenuation and better penetration to smoke, dust, and the like, and is less affected by weather. Therefore, the millimeter-wave radar has been widely used in a plurality of fields such as an intelligent vehicle, an uncrewed aerial vehicle, intelligent transportation, and industrial automation.

The operating wavelength in this embodiment of this application may be a central operating wavelength of the antenna or an operating wavelength corresponding to any frequency in an operating band of the antenna.

The terminal device in this embodiment of this application may be a terminal device in the application scenario, for example, may be a transportation tool or an intelligent device. For example, the terminal device may be a vehicle, for example, an unmanned vehicle, a smart vehicle, an electric vehicle, a digital vehicle, a bicycle, a car, a truck, a motorcycle, a bus, a lawn mower, an entertainment vehicle, a playground vehicle, a tram, a golf cart, a train, a transport vehicle, or a trolley. Alternatively, the terminal device described in this embodiment of this application is another tool, for example, an uncrewed aerial vehicle, a track car, a ship, an airplane, a helicopter, a construction device, or traffic lights. Optionally, the terminal device in this embodiment of this application may be another terminal, for example, a mobile phone, a tablet computer, a notebook computer, a personal digital assistant, a sales terminal, a vehicle-mounted computer, an augmented reality device, a virtual reality device, a wearable device, a vehicle-mounted terminal, a smart home device, or an intelligent robot. This is not specifically limited in embodiments of this application.

Figure 2:
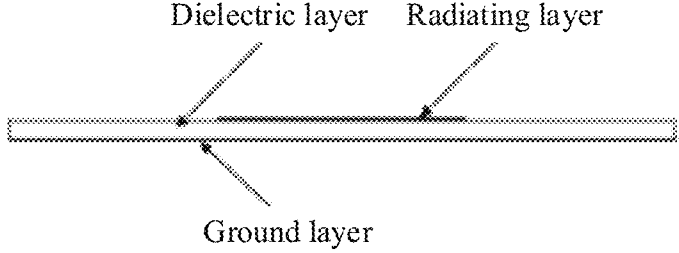
FIG. 2 is a schematic diagram of a structure of an antenna according to an embodiment of this application.

In a wireless product like a detection device, a microstrip antenna is widely used because of easy integration and low costs of the microstrip antenna. FIG. 2 is a side view of a structure of a microstrip antenna according to an embodiment of this application. The microstrip antenna includes a radiating layer, a dielectric layer, and a ground layer. The radiating layer and the ground layer are respectively located on both sides of the dielectric layer. In an embodiment, the microstrip antenna may be an antenna of a printed circuit board (PCB) structure. For example, a material of the dielectric layer may be a high-frequency circuit board material NF30, and a bottom layer is a metal floor layer.

This embodiment of this application is mainly an improvement on a radiating element on the radiating layer. For ease of description, the following antenna is a pattern of the radiating layer or a pattern of the radiating element on the radiating layer.

An embodiment of this application provides an antenna, including a plurality of sequentially connected radiating elements, that is, two adjacent radiating elements in the plurality of radiating elements are connected end to end. Widths of the radiating elements gradually decrease from one end of the antenna to the other end of the antenna. In this way, low side lobes at one side of the antenna are implemented. Alternatively, widths of the radiating elements gradually decrease (not required to sequentially decrease) from the middle of the antenna (not required to be a middle position) to both ends of the antenna, so that low side lobes at both sides of the antenna can be implemented.

In an embodiment, a width of a single radiating element may be non-uniform, so that the width of the single radiating element changes, and a bandwidth of the antenna may be further increased, that is, a broadband characteristic of the antenna is implemented. The radiating element whose width gradually changes may be designed in a uniform weighting manner, for example, a trapezoidal radiating element. A length of a line segment that is formed by connecting corresponding positions on two legs of the trapezoid and is parallel to bases may be considered as a width of the radiating element. It can be learned that the width gradually changes. In a case of uniform weighting, the width of the radiating element gradually changes smoothly, and an impedance matching effect is better, so that a bandwidth of the antenna can be further increased. Alternatively, when a width of a single radiating element is non-uniform, a width change of the radiating element may be implemented through non-uniform weighting. For example, the width of the radiating element is in a step-shaped change. The broadband or the broadband characteristic in this embodiment of this application may be understood as a characteristic of broadband impedance matching. A length of the radiating element is not limited in this embodiment of this application. A direction of the length of the radiating element is perpendicular to a direction of a width of the radiating element. For example, lengths of radiating elements of the antenna provided in this embodiment of this application may gradually decrease or become shorter from one end of the antenna to the other end of the antenna. Alternatively, lengths of radiating elements gradually decrease or become shorter from the middle (not required to be in the middle) of the antenna to both ends of the antenna.

In an embodiment, a width of a single radiating element may be designed to be uniform, for example, a parallelogram radiating element, and widths of all positions of the radiating element are uniform, to simplify antenna design.

The plurality of radiating elements provided in this embodiment of this application include radiating elements with a same width or different widths. For example, there may be two or more radiating elements with a largest width, widths of the two or more radiating elements are the same, and widths of remaining radiating elements may be the same or different. When the widths of the remaining radiating elements are different, widths of the radiating elements may uniformly decrease from the radiating element with a largest width to both ends or may non-uniformly decrease. Uniform decreasing may be understood as decreasing one by one or decreasing by group, and may be understood as smooth decreasing of widths of radiating elements from one end of an antenna to the other end of the antenna, or from the middle of an antenna to both ends of the antenna. Non-uniform decreasing may be understood as step-shaped decreasing or step-step decreasing in widths of radiating elements from one end of the antenna to the other end of the antenna or from the middle of the antenna to both ends of the antenna.

In an embodiment, the antenna includes a plurality of radiating elements, and widths of the radiating elements of the antenna are non-uniform. Alternatively, in the plurality of radiating elements, widths of some radiating elements are non-uniform, and widths of some radiating elements are uniform. Alternatively, widths of all of the radiating elements of the antenna are uniform.

A width of a single radiating element may be represented by a maximum width, a minimum width, or an average width of a radiating element, or may be represented by a width corresponding to any position of a radiating element, or the like. For example, a width of a radiating element in the plurality of radiating elements is a width at a same reference position, for example, a width corresponding to a half of each radiating element, or may be a width at another same reference position. This is not limited in embodiments of this application. For convenience, in this embodiment of this application, the maximum width of the radiating element is used as an example for description. Unless otherwise specified, the following width of the radiating element is the maximum width of the radiating element, but this embodiment of this application is also applicable when the maximum width is replaced with the minimum width, the average width, a width at a same reference position, or the like.

The antenna provided in this embodiment of this application includes a plurality of radiating elements, and the plurality of radiating elements are sequentially connected. An included angle between two adjacent radiating elements is greater than 0° and less than 180°. The plurality of radiating elements include a second radiating element and a first radiating element. In a first direction, the second radiating element is located on a first side of the first radiating element, and a width of the first radiating element is greater than a width of the second radiating element.

In an embodiment, the second radiating element and the first radiating element are connected through at least one radiating element, that is, it is considered that the second radiating element and the first radiating element are indirectly connected. In an embodiment, in the first direction, widths from the second radiating element to the first radiating element gradually increase. That is, widths of radiating elements gradually increase from a radiating element at one end of the antenna to a radiating element at the other end of the antenna, to implement low side lobes at one end of the antenna.

In an embodiment, the plurality of radiating elements of the antenna further include a third radiating element, and in the first direction, the third radiating element is located on a second side of the first radiating element. The width of the first radiating element is greater than a width of the third radiating element. In an embodiment, the first radiating element and the third radiating element are connected through at least one radiating element, that is, it is considered that the first radiating element and the third radiating element are indirectly connected. In an embodiment, in the first direction, widths of radiating elements gradually decrease from the first radiating element of the antenna to the first side and the second side. It may be understood that, widths of radiating elements gradually decrease from a radiating element near the middle of the antenna to both ends of the antenna. In this way, low side lobes at both ends of the antenna are implemented.

The first radiating element may be a radiating element with a largest width in the plurality of radiating elements, the second radiating element may be a radiating element with a smallest width in the radiating elements on one side of the first radiating element, and the third radiating element may be a radiating element with a smallest width in the radiating elements on the other side of the first radiating element. A width of the second radiating element may be equal to or not equal to the width of the third radiating element.

In the foregoing embodiment, gradually decreasing widths of radiating elements refers to a trend of decreasing widths, and may decrease one by one. For example, widths of radiating elements of an antenna are distributed in a shape of a cone pin. Alternatively, widths of radiating elements of an antenna may decrease by group. For example, widths of the radiating elements of an antenna are distributed in a shape that is like a cone pin. For example, one side or both sides of the first radiating element include N groups of radiating elements, each group of radiating elements has a same width, and widths of radiating elements between groups are different. In addition, in a direction from the first radiating element to one side or both sides of the first radiating element, widths of radiating elements decrease by group, and quantities of radiating elements between groups are the same or different. Alternatively, in a direction from the first radiating element to one side or both sides of the first radiating element, widths of some radiating elements may slightly increase, provided that a decreasing trend of an overall width of the antenna is not affected. For example, when side lobes on a single side of the antenna are low, the second radiating element may be located on a device side of the radiating element of the antenna, or may be located on a secondary device side. Although a width of the radiating element on the device side is slightly greater than that of the second radiating element, a trend of decreasing widths may also be implemented, to implement low side lobes of the antenna. For another example, when side lobes on both sides of the antenna are low, the second radiating element and the third radiating element may be located on a device side of the radiating element of the antenna, or may be located on a secondary device side. Although a width of the radiating element on the device side is slightly greater than that of the second radiating element and the third radiating element, a trend of decreasing widths may also be implemented, to implement low side lobes of the antenna.

It can be learned that, in the antenna provided in this embodiment of this application, and the plurality of radiating elements are sequentially connected. The included angle between adjacent radiating elements is greater than 0° and less than 180°, to form a broken-line or curve structure. In addition, widths of the radiating elements basically tend to decrease from one end of the antenna to the other end of the antenna or from the middle of the antenna to both ends of the antenna, so that the antenna is miniaturized and a wide beam characteristic in a direction perpendicular to the first direction is implemented, and low side lobes on a single side or both sides are implemented. That the widths of the radiating elements basically tend to decrease may be understood as that, from a radiating element at one end of the antenna to a radiating element at the other end of the antenna, the widths of the radiating elements decrease or narrow as a whole. Alternatively, from the middle of the antenna to both ends of the antenna, the widths of the radiating elements are generally presented as follows: Widths of radiating elements close to the middle of the antenna are greater than widths of radiating elements close to both the ends of the antenna.

According to the antenna provided in this embodiment of this application, a width of a radiating element may be flexibly designed based on a requirement, and a change trend of widths of radiating elements from one end to the other end of the antenna may also be flexibly designed. For example, to implement low side lobes at one end of the antenna, widths of radiating elements from one end to the other end of the antenna gradually decrease. It may be understood that, gradually decreasing widths of radiating elements from one end to the other end of the antenna means a gradual decrease in an overall trend. For example, the second radiating element is located at a first end of the antenna, the first radiating element is located at a second end of the antenna, and the antenna further includes a fourth radiating element connected to the second radiating element. A width of the first radiating element is greater than a width of the second radiating element, and the width of the second radiating element is greater than a width of the fourth radiating element. It may be understood that an overall trend of widths of radiating elements from one end to the other end of the antenna gradually decreases. That is, in a direction from the first radiating element to one side or both sides of the first radiating element, widths of some radiating elements may slightly increase, provided that a decreasing trend of an overall width of the antenna is not affected. This can implement low side lobes of the antenna. In this embodiment of this application, a quantity of radiating elements included in each antenna is merely an example. The antenna provided in this embodiment of this application may include an odd quantity of radiating elements, or may include an even quantity of radiating elements. A quantity of radiating elements included in the antenna is not limited in embodiments of this application.

Figure 3A:
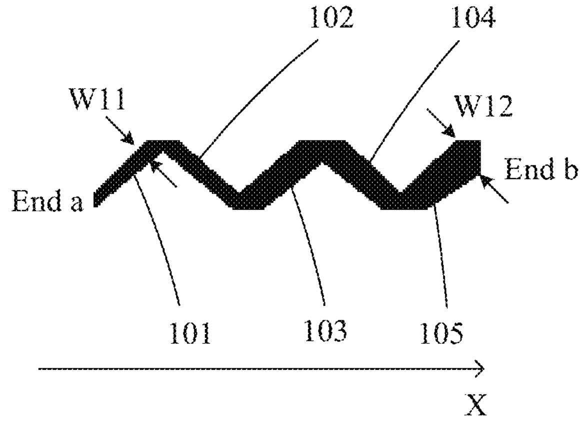
FIG. 3*a* is a schematic diagram of a structure of an antenna according to an embodiment of this application.

FIG. 3*a* is a schematic diagram of a structure of an antenna according to an embodiment of this application. The antenna includes a plurality of sequentially connected radiating elements, for example, radiating elements 101 to 105 shown in the figure. In addition to the radiating elements 101 and 105 at both ends of the antenna, the other radiating elements 102 to 104 are sequentially connected end to end. Widths of the plurality of radiating elements gradually increase from an end a of the antenna to an end b of the antenna. The antenna with a broken-line structure (a broken-line antenna) shown in FIG. 3*a* may implement low energy of side lobes between a main lobe and the end a of the antenna. This may also be understood as low side lobes at the end a of the antenna. It may be understood that the widths of the radiating elements of the antenna gradually increase from the end a to the end b, and then the widths of the radiating elements gradually decrease from the end b to the end a of the antenna.

The widths of the radiating elements of the antenna shown in FIG. 3*a* are non-uniform. In an embodiment, widths of some radiating elements of the antenna are non-uniform, and widths of some radiating elements are uniform (not shown). In an embodiment, widths of all of the radiating elements of the antenna are uniform (not shown).

Figure 3B:
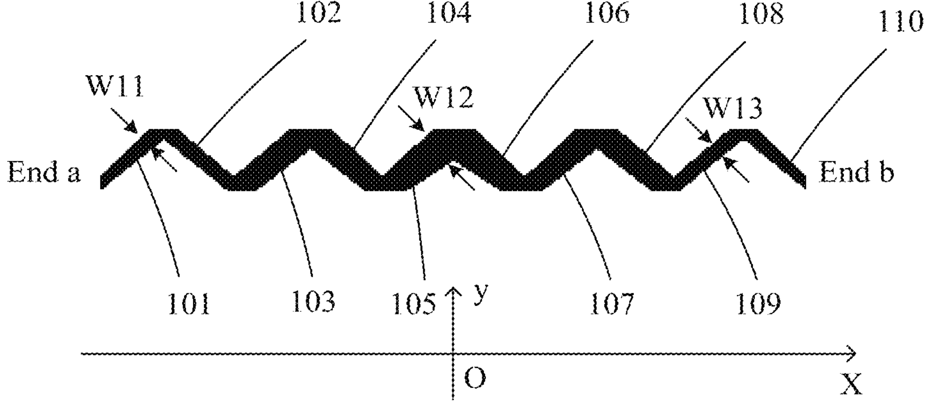
FIG. 3*b* is a schematic diagram of a structure of an antenna according to an embodiment of this application.

Alternatively, low side lobes at both ends of the antenna may be further implemented. FIG. 3*b* is a schematic diagram of a structure of an antenna according to an embodiment of this application. The antenna includes a plurality of sequentially connected radiating elements, for example, radiating elements 101 to 110 shown in the figure. In addition to the radiating elements 101 and 110 at both ends of the antenna, the other radiating elements 102 to 109 are sequentially connected end to end.

It may be learned from FIG. 3*b* that widths of the plurality of radiating elements gradually narrow from the middle (near a point O) of the antenna to both the ends of the antenna, an end a, or an end b. In an embodiment, as shown in FIG. 3*b*, the plurality of radiating elements are symmetrical about a Y axis in the figure. It can be learned that, when the plurality of radiating elements of the antenna are symmetrical about the Y axis, symmetry of a pattern of the antenna can be improved. In an embodiment, with reference to FIG. 3*b*, if the antenna includes only the radiating elements 101 to 109, the plurality of radiating elements are asymmetric about the Y axis in the figure. The plurality of radiating elements 101 to 110 include a second radiating element 101, a first radiating element 105, and a third radiating element 109. It can be learned from FIG. 3*b* that the second radiating element 101 and the first radiating element 105 are connected through a plurality of radiating elements (the radiating elements 102 to 104), that is, there are a plurality of sequentially connected radiating elements between the second radiating element 101 and the first radiating element 105, so that the second radiating element 101 and the first radiating element 105 are indirectly connected. The first radiating element 105 and the third radiating element 109 are connected through a plurality of radiating elements (the radiating elements 106 to 108), that is, there are a plurality of sequentially connected radiating elements between the first radiating element 105 and the third radiating element 109, so that the first radiating element 105 and the third radiating element 109 are indirectly connected. A width W11 of the second radiating element 101 is less than a width W12 of the first radiating element 105, and a width W13 of the third radiating element 109 is less than the width W12 of the first radiating element 105. The width W11, the width W12, and the width W13 shown in FIG. 3*b* are respectively maximum widths of the second radiating element 101, the second radiating element 105, and the third radiating element 109. A position of a maximum width of each radiating element shown in FIG. 3*b* is merely an example. The position corresponding to the maximum width of the radiating element may be designed based on a requirement. For example, the position of the maximum width of the radiating element corresponds to an end of the radiating element, that is, a width corresponding to a position of an end that is of the radiating element and that is connected to another radiating element is the largest. Alternatively, the position corresponding to the maximum width of the radiating element is at a middle point of the radiating element. The position of the maximum width of the radiating element may be flexibly designed based on a requirement. The position of the maximum width of the radiating element is not limited in this embodiment of this application.

Still refer to FIG. 3*b*. A width of the radiating element 110 is slightly greater than the width of the radiating element 109. From the middle to both ends of the antenna, an overall trend is still gradually decreasing, and the antenna can still implement a low side lobe effect at both the ends. That the width of the radiating element 110 is slightly greater than the width of the radiating element 109 means a width change is within a tolerance range. Similarly, between the radiating element 101 and the radiating element 105, a case in which a width of a radiating element close to the radiating element 105 is slightly less than a radiating element that is adjacent to the radiating element and that is far away from the radiating element 105 (that is, close to the end a) may also exist; and between the radiating element 110 and the radiating element 105, a case in which a width of a radiating element close to the radiating element 105 is slightly less than a radiating element that is adjacent to the radiating element and that is far away from the radiating element 105 (that is close to the end b) may also exist.

With reference to FIG. 3*b*, a quantity of radiating elements between the second radiating element 101 and the first radiating element 105 is not limited in this embodiment of this application. For example, there may be three radiating elements (the radiating elements 102 to 104) in the figure, or there may be more or fewer radiating elements. Similarly, a quantity of radiating elements between the first radiating element 105 and the third radiating element 109 is not limited in this embodiment of this application. For example, there may be three radiating elements (the radiating elements 106 to 108) in FIG. 3*b*, or there may be more or fewer radiating elements. For example, there may be no other radiating element between the second radiating element 101 and the first radiating element 105, that is, an end of the second radiating element 101 is directly connected to an end of the first radiating element 105 (not shown). Likewise, there may be no other radiating element between the first radiating element 105 and the third radiating element 109, that is, an end of the first radiating element 105 is directly connected to an end of the third radiating element 108 (not shown).

Figure 4A:
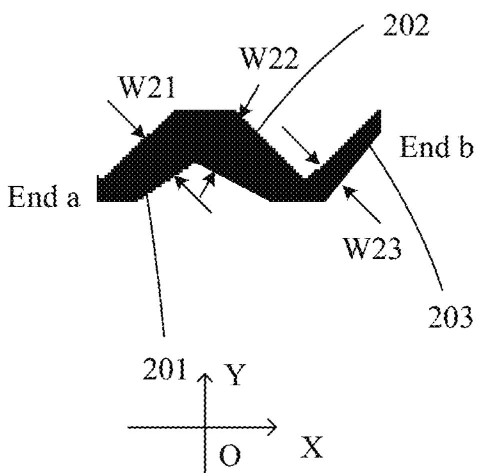
FIG. 4*a* is a schematic diagram of a structure of an antenna according to an embodiment of this application.

In an embodiment, three radiating elements the second radiating element, the first radiating element, and the third radiating element may also be sequentially connected. Refer to FIG. 4*a*. An antenna in FIG. 4*a* includes three radiating elements, which are specifically radiating elements 201 to 203. A second radiating element may be a radiating element 201, a first radiating element may be a radiating element 202, and a third radiating element may be a radiating element 203. A width W22 of the first radiating element 202 is greater than a width W21 of the second radiating element 203, and the width W22 of the first radiating element 202 is greater than a width W23 of the third radiating element 203. It can be learned that, in the antenna shown in FIG. 4*a*, the radiating elements have different widths, and a width of the radiating element in the middle of the antenna is greater than widths of the radiating elements at both ends of the antenna, so that low side lobes at both the ends of the antenna can be implemented. That is, low energy of side lobes between an end a and a main lobe of the antenna is implemented, and low energy of side lobes between an end b and the main lobe of the antenna is implemented.

Alternatively, some of the radiating elements have different widths. For example, the width W22 of the first radiating element 202 is equal to the width W21 of the second radiating element 203, and the width W22 of the first radiating element 202 is greater than the width W23 of the third radiating element 203 (these are not shown), so that low side lobes between the main lobe and the end b of the antenna can be implemented. Alternatively, the width W22 of the first radiating element 202 is greater than the width W21 of the second radiating element 203, and the width W22 of the first radiating element 202 is equal to the width W23 of the third radiating element 203 (these are not shown), so that low side lobes between the main lobe and the end a of the antenna can be implemented. In addition, in an X direction, from the first radiating element 202 to both sides, that is, from the first radiating element 202 to both the ends (the end a and end b) of the antenna, widths of the radiating elements decrease. In the antenna shown in FIG. 4*a*, widths of different radiating elements are also flexibly designed. From the middle of the antenna to both the ends of the antenna, an overall trend of the widths of the radiating elements decreases. This implements a broadband and low side lobe characteristic of the antenna. The widths of the radiating elements of the antenna shown in FIG. 4*a* are non-uniform. In an embodiment, widths of some radiating elements of the antenna are non-uniform, and widths of some radiating elements are uniform (not shown). In an embodiment, widths of all of the radiating elements of the antenna are uniform (not shown).

In an implementation, a fourth radiating element is included between the second radiating element and the first radiating element, and a width of the fourth radiating element is the same as the width of the first radiating element; and/or the fourth radiating element is included between the first radiating element and the third radiating element, and a width of the fourth radiating element is the same as the width of the first radiating element. The widths of the two radiating elements described in this embodiment of this application are the same. When shapes of the two radiating elements are different, it may be understood that maximum widths of the two radiating elements are the same. In an embodiment, when the shapes of the two radiating elements are the same, it may be understood that widths at corresponding positions of the two radiating elements are the same.

Figure 4B:
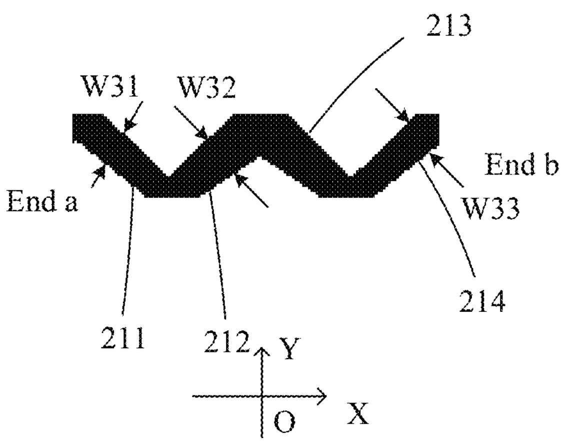
FIG. 4*b* is a schematic diagram of a structure of an antenna according to an embodiment of this application.

An example in which one fourth radiating element is included between the first radiating element and the third radiating element is used below for description. Refer to FIG. 4*b*. An antenna includes a plurality of radiating elements 211 to 214, which are specifically a second radiating element 211, a first radiating element 212, a fourth radiating element 213, and a third radiating element 214. It can be learned that the fourth radiating element 213 is included between the first radiating element 212 and the third radiating element 214. A width W32 of the first radiating element 212 is equal to a width of the fourth radiating element 213 and is greater than a width W31 of the second radiating element 211, and the width W32 of the first radiating element 212 is equal to the width of the four radiating elements 213 and is greater than a width W33 of the third radiating element 214. In this embodiment of this application, a size relationship between the width W31 of the second radiating element 211 and the width W33 of the third radiating element 214 is not limited.

FIG. 4*b* shows that one fourth radiating element is included between the first radiating element and the third radiating element. In an embodiment, a plurality of fourth radiating elements are included between the first radiating element and the third radiating element. Alternatively, at least one fourth radiating element is included between the second radiating element and the first radiating element. A quantity of fourth radiating elements included between the second radiating element and the first radiating element, or a quantity of fourth radiating elements included between the first radiating element and the third radiating element is not limited in this embodiment of this application.

In this embodiment of this application, a quantity (three: the radiating elements 102 to 104 shown in FIG. 3*b*) of radiating elements connecting the second radiating element and the first radiating element, or a quantity (three: the radiating elements 106 to 108 shown in FIG. 3*b*) of radiating elements connecting the first radiating element and the third radiating element is not limited in this embodiment of this application. Shapes of different radiating elements may be the same or may be different. For example, with reference to FIG. 3*b*, a shape and a size of a fourth radiating element 106 are the same as those of the first radiating element 105. Further, a width of the fourth radiating element 106 is the same as the width of the first radiating element 105. It can be learned from FIG. 3*b* that the fourth radiating element 106 and the first radiating element 105 are symmetrical about the Y axis. Along a side that is of the fourth radiating element 106 and is away from the first radiating element 105, that is, a positive direction of an X axis shown in FIG. 3*b*, widths of the radiating elements decrease. In an embodiment, widths of the radiating elements gradually decrease along the positive direction of the X axis. In addition, along a side that is of the first radiating element 105 and is away from the fourth radiating element 106, that is, a negative direction of the X axis shown in FIG. 3*b*, widths of the radiating elements decrease. In an embodiment, widths of the radiating elements gradually decrease along the negative direction of the X axis. The width of the fourth radiating element 106 is the same as the width of the first radiating element 105, and shapes of the two radiating elements may be different (not shown).

A decrease in the widths of the radiating elements includes that the widths of the radiating elements decrease sequentially, and the widths of the radiating elements decrease sequentially along the first radiating element to both sides, as shown in FIG. 4*a*.

In an embodiment, a decrease in the widths of the radiating elements includes that the widths of the radiating elements are first kept consistent and then decrease. This may be understood as that the widths of the radiating elements decrease by group. As shown in FIG. 3*b*, widths of the radiating elements 107 and 108 are the same, and are greater than the width of the radiating element 109. That is, from the radiating element 107 to the radiating element 109, widths of the radiating elements are first kept the same, and then decrease. From a middle attachment of the antenna, as shown by a point O in FIG. 3*b*, to both ends of the antenna, an overall trend of widths of the radiating elements of the antenna decreases, and the antenna can also implement effects of broadband and low side lobes. It may also be understood that the radiating elements 107 and 108 are in one group, and widths of the radiating elements in the group are the same. The radiating element 109 may also be understood as a radiating element group of a single radiating element. Therefore, it can be learned that radiating elements in a group have a same width. With reference to FIG. 3*b*, from the first radiating element 105 or the first radiating element 106 to both sides, widths of the radiating elements in a group first remain unchanged, and then widths decrease. That is, widths of the radiating elements decrease by group. For another example, with reference to FIG. 4*b*, from the first radiating element 212 to an end b of the antenna, a width of the radiating element is first maintained as W32 of the fourth radiating element 213, and then a width decreases to W33 of the third radiating element 214.

Figure 5:
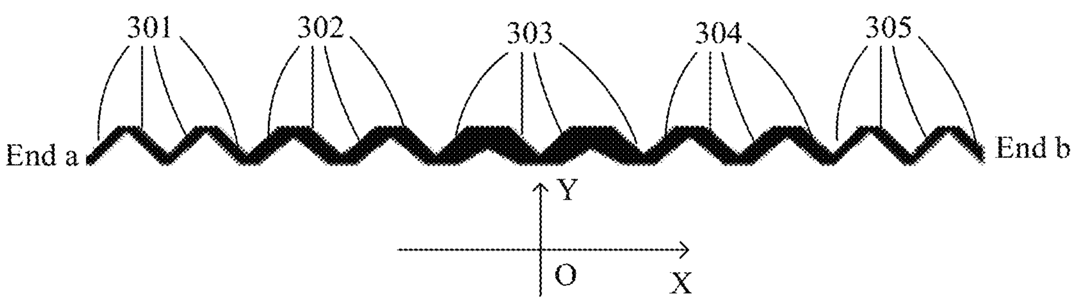
FIG. 5 is a schematic diagram of a structure of an antenna according to an embodiment of this application.

Further refer to FIG. 5. An antenna shown in FIG. 5 includes 20 radiating elements, and specifically includes five radiating element groups 301 to 305. Each radiating element group includes four radiating elements, and the radiating elements in a group have a same width. A width of any radiating element in a radiating element group 303 is greater than a width of any radiating element in a radiating element group 302. The width of any radiating element in the radiating element group 302 is equal to a width of any radiating element in a radiating element group 304. The width of any radiating element in the radiating element group 304 is greater than a width of any radiating element in a radiating element group 301. The width of any radiating element in the radiating element group 301 is equal to a width of any radiating element in a radiating element group 305. It can be learned from FIG. 4*a* that, near the middle of the antenna, as shown in an origin point of an X axis in the figure, along the X axis to both ends (an end a and end b) of the antenna, widths of radiating elements decrease, that is, widths of radiating elements in the radiating element group 303 are greater than widths of radiating elements in the radiating element groups at both ends of the antenna, so that the antenna can implement low side lobes and miniaturization. Any radiating element in the radiating element group 303 may be considered as a first radiating element, or the entire radiating element group 303 may be considered as a first radiating element group. Any radiating element in the radiating element group 301 may be considered as a second radiating element, or the entire radiating element group 301 may be considered as a second radiating element group. Any radiating element in the radiating element group 305 may be considered as a third radiating element, or the entire radiating element group 305 may be considered as a third radiating element group. From the first radiating element group to both sides, that is, a positive direction or a negative direction of an X axis in FIG. 5, widths of radiating elements decrease by group.

Figure 6:
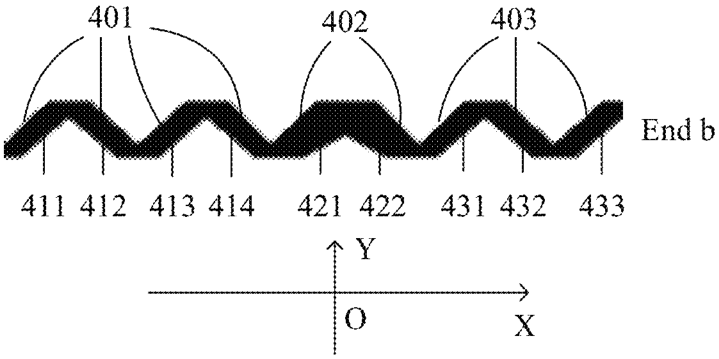
FIG. 6 is a schematic diagram of a structure of an antenna according to an embodiment of this application.

It can be learned that, in the antenna shown in FIG. 5, four radiating elements form a group, different radiating elements in the group have a same width, and from the radiating element group 303 to both the sides, that is, in the positive direction or the negative direction of the X axis in the figure, widths of different radiating elements in different groups decrease. From the middle to both the ends of the antenna, an overall trend of widths of radiating elements decreases. This implements low side lobes and miniaturization of the antenna. A quantity of radiating elements in a group of radiating elements with a same width shown in FIG. 5 is 4. In an embodiment, the radiating element group may further include another quantity of radiating elements, for example, 2 or 7. Quantities of radiating elements in different radiating element groups may be the same or different. Shapes of radiating elements in different radiating element groups may be the same or different. As shown in FIG. 6, an antenna shown in FIG. 6 includes radiating elements 411 to 414, radiating elements 421 and 422, and radiating elements 431 to 433. The radiating elements 411 to 414 have a same width, and may be understood as a radiating element group 401. Likewise, a radiating element group 402 includes the radiating elements 421 and 422. A radiating element group 403 includes the radiating elements 431 to 433. It can be learned that, the radiating element group 401 includes four radiating elements of a same width, the radiating element group 402 includes two radiating elements of a same width, and the radiating element group 403 includes three radiating elements of a same width. That is, quantities of radiating elements included in different radiating element groups may be the same or may be different. Widths of radiating elements at both ends of the antenna are less than widths of other radiating elements at positions outside both the ends of the antenna. The antenna presents a broken-line or curve form, and an overall trend of widths of the radiating elements decreases from the middle to both the ends. Therefore, a broadband antenna with low side lobes and miniaturization is implemented in this embodiment of this application.

In the antenna shown in FIG. 6, an example in which a second radiating element is a radiating element 411, a first radiating element is a radiating element 421, and a third radiating element is a radiating element 433 is used for description. In this case, the antenna includes a fourth radiating element 422. In addition to the fourth radiating element 422, a first quantity of radiating elements included between the second radiating element 411 and the first radiating element 421 is 3 (412 to 414), and a second quantity of radiating elements included between the first radiating element 421 and the third radiating element 431 is 2 (431 and 432). It can be learned that a difference between the first quantity and the second quantity is 1. In an embodiment, the first quantity and the second quantity may alternatively be the same (not shown).

In the antenna shown in FIG. 6, in addition to the fourth radiating element 422, widths of radiating elements between the second radiating element 411 and the first radiating element 421 each are equal to a width of the second radiating element 411 and less than a width of the first radiating element 421. Widths of radiating elements between the first radiating element 421 and the third radiating element 433 each are equal to a width of the third radiating element 433 and less than the width of the first radiating element 421. In an embodiment, in addition to the fourth radiating element 422, widths of radiating elements between the second radiating element 411 and the first radiating element 421 each may be greater than a width of the second radiating element 411 and less than a width of the first radiating element 421 (not shown). Widths of radiating elements between the first radiating element 421 and the third radiating element 433 each are greater than a width of the third radiating element 433 and less than the width of the first radiating element 421. In an embodiment, widths of radiating elements between the second radiating element 411 and the first radiating element 421 each are greater than a width of the second radiating element 411 and equal to a width of the first radiating element 421. Widths of radiating elements between the first radiating element 421 and the third radiating element 433 each are greater than a width of the third radiating element 433 and equal to the width of the first radiating element 421 (not shown).

When widths of radiating elements decrease by group, except that a width of a single radiating element in the radiating element group shown in the foregoing example is non-uniform, a width of a radiating element in each radiating element group may also be uniform, that is, a width corresponding to each position of the single radiating element is the same, for example, a parallelogram radiating element. A width of a radiating element in a radiating element group closer to both the ends of the antenna is smaller, and a width of a radiating element in a radiating element group closer to the middle of the antenna is larger. An overall trend of the width of the radiating element decreases from the middle to both the ends of the antenna, and low side lobes of the antenna can also be implemented. In addition, because radiating elements in different radiating element groups are the same, antenna design can be simplified. Similarly, a width of the antenna shown in FIG. 6 in a Y direction is small, for example, may be less than 0.5 times an operating wavelength. This implements miniaturization of the antenna.

In the antenna shown in the foregoing embodiments, the plurality of radiating elements are sequentially connected to form a broken-line shape. In an embodiment, the plurality of radiating elements may also be sequentially connected to form a curve shape. FIG. **7*a* is a schematic diagram of a structure of an antenna according to an embodiment of this application. The antenna includes eight radiating elements 501 to 508. In this embodiment of this application, a curve formed by the radiating elements 501 to 508 is symmetrical about a Y axis. A first radiating element may be a radiating element 504, a second radiating element may be a radiating element 501, and a third radiating element may be a radiating element 508. A width W52 of the first radiating element 504 is greater than a width W51 of the second radiating element 501, and the width W52 of the first radiating element 504 is greater than a width W53 of the third radiating element. Widths of radiating elements 503 to 506 shown in FIG. 7*a* may be the same or different, and widths of radiating elements 501, 502, 507, and 508 may be the same or different. A width of a radiating element 505 is equal to the width of the radiating element 504, that is, the radiating element 505 may be understood as the foregoing fourth radiating element. In addition to the fourth radiating element 505, two radiating elements (502 and 503) are included between the second radiating element 501 and the first radiating element 504, and two radiating elements (506 and 507) are included between the first radiating element 504 and the third radiating element 508**.

In FIG. **7*a*, the radiating elements 504 and 505 have a same width, the radiating elements 503 to 506 have a same width, the radiating elements 501 and 502 have a same width, and the radiating elements 507 and 508 have a same width. A plurality of radiating elements of the antenna are symmetrical about the Y axis. In this embodiment of this application, widths of radiating elements gradually decrease from the first radiating element 504 to an end a of the antenna and from the third radiating element 505** to an end b of the antenna. Therefore, from the middle to both the ends of the antenna, an overall trend of widths of radiating elements decreases, and the antenna may be obtained through fitting according to the Bessel function. This implements low side lobes of the curved antenna. In addition, a width of the antenna in a Y direction is small, for example, less than 0.5 times an operating wavelength. This implements miniaturization of the antenna.

Figure 7A:
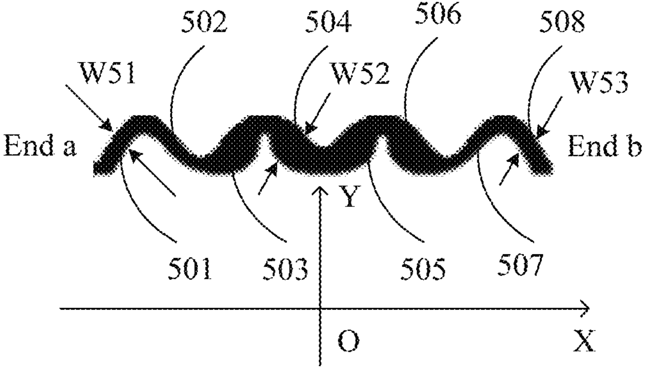
FIG. 7*a* is a schematic diagram of a structure of an antenna according to an embodiment of this application.

An electrical length of the antenna shown in FIG. 7*a* in the Y direction is less than M times the operating wavelength, where M is greater than 0. The electrical length is a length of an antenna size relative to an operating wavelength. For example, at a frequency of 76.5 GHz, an electrical length of the antenna in the Y direction is less than 0.52, where À represents an operating wavelength of the antenna. The operating wavelength may be a central operating wavelength of the antenna or an operating wavelength corresponding to any frequency in an operating frequency band of the antenna. The antenna shown in FIG. 7*a* has characteristics such as broadband impedance, wide beam, and low side lobe. The antenna may implement a bandwidth greater than 1 GHz, for example, 75 GHz to 82 GHz, with a reflection coefficient less than −10 dB, to implement a broadband characteristic of the antenna.

Figure 7B:
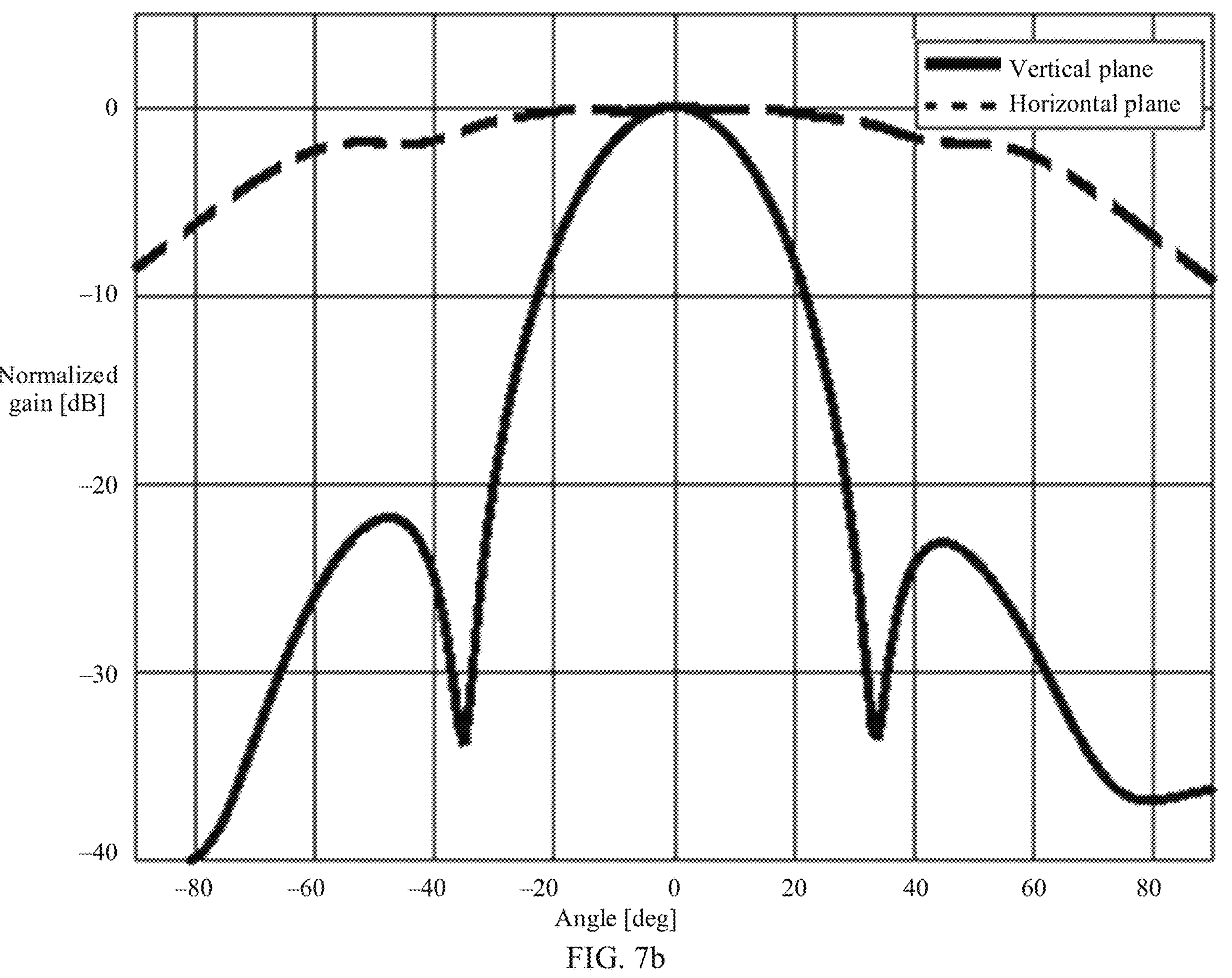
FIG. 7*b* is a simulation pattern of the antenna shown in FIG. 7*a;*

FIG. 7*b* is a simulation pattern of the antenna shown in FIG. 7*a*. It can be learned that, in a horizontal direction, that is, in the Y direction shown in FIG. 7*a*, a normalized gain is greater than −10 dB, an angle range may be from −85° to +85°, and a horizontal beam is excessively wide. In addition, in a vertical direction, that is, in the X direction shown in FIG. 7*a*, a maximum gain of a side lobe is only −22 dB. This implements low side lobes of a beam in the vertical direction. However, a gain of a side lobe of a curved antenna in the conventional technology is only about −15 dB. The antenna in this embodiment of this application greatly reduces energy of side lobes, and improves a radiation capability of a main lobe of the antenna.

It can be learned from the foregoing that, according to the broken-line antenna or the curved antenna provided in this embodiment of this application, widths of radiating elements in the broken-line antenna or the curved antenna are flexibly weighted, to implement design of a broadband antenna. In an embodiment, widths of radiating elements that are not at both ends of the antenna are greater than widths of radiating elements that are at both the ends of the antenna, and low side lobes on a single side or both sides of the antenna may be further implemented. In addition, the antenna is in a second direction, and the second direction is perpendicular to the first direction. For example, in the Y direction in the foregoing embodiments, an overall width of the antenna is small, for example, less than a half operating wavelength. This implements miniaturization of the antenna.

The width of the radiating element in this embodiment of this application may be represented through a manner shown in FIG. 3*a* to FIG. 7*a*, that is, a width perpendicular to a tilt direction of the antenna element. A tilt direction of the radiating element 105 shown in FIG. 3*b* is a +45° direction. A width of the radiating element shown in the figure is a (maximum) width in a +135° direction. Optionally, the width of the radiating element in this embodiment of this application may also be uniformly represented by a (maximum) width in the X direction, or uniformly represented by a width in the Y direction. This is not limited in this embodiment of this application.

According to the broken-line antenna or the curved antenna provided in this embodiment of this application, not only a width of a radiating element may be flexibly weighted, but also an included angle between two adjacent radiating elements may be flexibly designed based on a requirement. In this embodiment of this application, an included angle between adjacent radiating elements that are not at both ends of the antenna and an included angle between adjacent radiating elements that are at both the ends of the antenna may be the same or different.

It can be learned that, in this embodiment of this application, when widths of the radiating elements that are not at both the ends of the antenna is greater than widths of the radiating elements that are at both the ends of the antenna, to implement low side lobes of the antenna, the side lobes of the antenna can be further reduced by further enabling the included angle between the adjacent radiating elements that are not at both ends of the antenna to be less than the included angle between the adjacent radiating elements that are at both the ends of the antenna.

Figure 8:
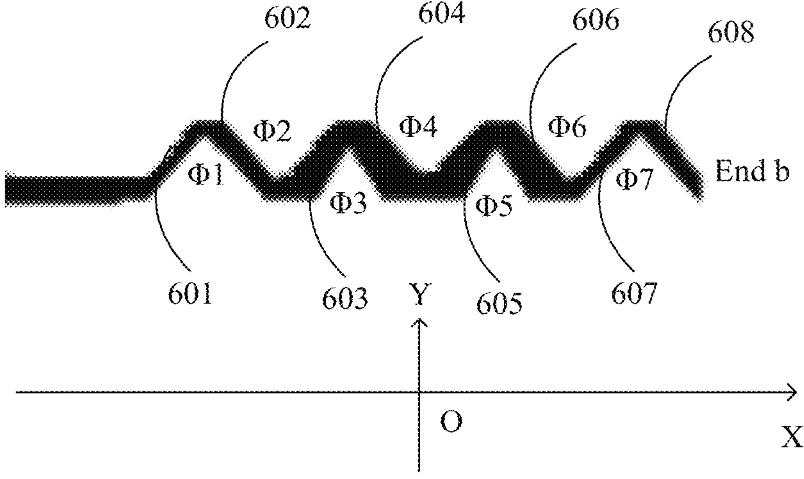
FIG. 8 is a schematic diagram of a structure of an antenna according to an embodiment of this application.

The following provides description with reference to FIG. 8. FIG. 8 shows a broken-line antenna, including eight radiating elements 601 to 608. Included angles between two adjacent radiating elements are Φ1 to Φ7 from an end a to an end b of the antenna. Widths of radiating elements 603 to 606 are greater than widths of radiating elements 601 and 602, and the widths of the radiating elements 603 to 606 are greater than widths of radiating elements 607 and 608, so that a broadband and side lobes of the antenna are implemented. Further, an included angle Φ3 between a radiating element 603 and a radiating element 604 is less than an included angle Φ1 between a radiating element 601 and a radiating element 602. This further reduces the side lobes of the antenna.

In an embodiment, the included angle Φ3 shown in FIG. 8 may be equal to an included angle Φ5, and is less than the included angle Φ1. In an embodiment, Φ1 may be equal to Φ7, or Φ1 may not be equal to Φ7. As shown in FIG. 8, the included angle Φ7 is greater than the included angle Φ3, and the included angle Φ3 is greater than the included angle Φ5. According to the antenna provided in this embodiment of this application, an included angle between adjacent radiating elements may be flexibly designed based on a requirement. In addition, in this embodiment of this application, when an included angle between adjacent radiating elements that are not at both ends of the antenna is less than an included angle between adjacent radiating elements that are at both the ends of the antenna, low side lobes of the antenna can be implemented.

An included angle Φ between radiating elements in this embodiment of this application may be used to indicate an included angle between two intersecting sides of the radiating elements shown in FIG. 8, or may be an included angle between tilt directions of the radiating elements, where the tilt direction may be a central line of the radiating element along a length of the radiating element. Still refer to FIG. 8. If a tilt direction of a radiating element 605 is +60°, and a tilt direction of a radiating element 606 is +120°, the included angle Φ5 between the radiating element 605 and the radiating element 606 is 60°. A definition manner of the included angle between the radiating elements herein is merely an example, and is not limited in this embodiment of this application.

A quantity, a shape, and a size of the radiation antenna in the foregoing embodiments are merely examples, and are not intended to limit this embodiment of this application. For example, lengths of different radiating elements may be different, or the radiating elements may be connected as a broken line or a curve (wave). A plurality of radiating elements of the antenna are sequentially connected, and an included angle between adjacent radiating elements is greater than 0° and less than 180°. The plurality of radiating elements include a second radiating element, a first radiating element, and a third radiating element. In a first direction, the second radiating element and the third radiating element are respectively located on both sides of the first radiating element. A width of the first radiating element is greater than a width of the second radiating element, and the width of the first radiating element is greater than a width of the third radiating element. Alternatively, a width of the first radiating element is equal to a width of the second radiating element, and the width of the first radiating element is greater than a width of the third radiating element. Alternatively, a width of the first radiating element is greater than a width of the second radiating element, and the width of the first radiating element is equal to a width of the third radiating element.

It should be noted that the foregoing embodiments may be separately or jointly implemented. This is not limited in this embodiment of this application. For example, a broken-line antenna and a curved antenna may be used in combination. According to the antenna provided in this embodiment of this application, a width of a single radiating element and a change trend of widths between a plurality of radiating elements are properly designed, so that a radiation beam of the antenna can be adjusted as required. For example, the change trend of widths gradually decreases according to the foregoing embodiments, low side lobes of the antenna can be implement. The low side lobes of the antenna in this embodiment of this application may be understood as low energy of side lobes of radiation beams of the antenna or low side lobes of a radiation pattern corresponding to the antenna. Alternatively, to implement another effect of the beam, widths of the radiating elements of the antenna from one end to the other end may be first increased, then decreased, then increased, and then decreased. Alternatively, widths of the radiating elements of the antenna from one end to the other end is periodically increased and then decreased.

The low side lobes in this embodiment of this application mean that side lobes of the broken-line antenna provided in this embodiment of this application is low compared with a broken-line antenna whose widths of all radiating elements are the same, or side lobes of the curved antenna provided in this embodiment of this application is low compared with a curved antenna whose widths of all radiating elements are the same.

Figure 9A:
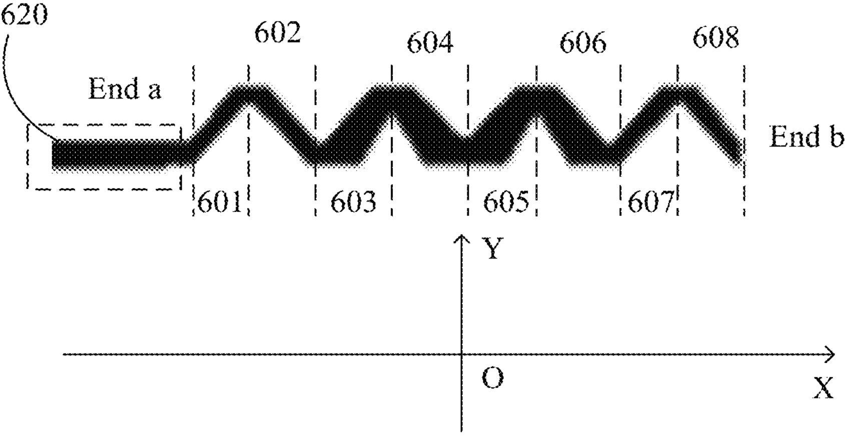
FIG. 9*a* is a schematic diagram of a structure of an antenna according to an embodiment of this application.

In addition, the radiating element in this embodiment of this application may be understood as an element configured to radiate or receive an electromagnetic wave. In the antennas shown in FIG. 3*b* to FIG. 8, for ease of illustration, the radiating element is divided in the following manner: Straight lines parallel to a Y-axis are separately made via a plurality of bend points (inflection points) of a broken-line antenna, and a part between two adjacent straight lines may be considered as one radiating element, as shown in FIG. 9*a*. Similarly, straight lines parallel to the Y-axis are separately made via a plurality of bend points (inflection points) of a curved antenna, and a part between two adjacent straight lines may be considered as one radiating element (not shown). The radiating element may be further divided in another manner. This is not limited in this embodiment of this application.

One end of the antenna provided in this embodiment of this application, for example, an end a, may further include impedance matching, for example, impedance matching 620 shown in FIG. 9*a*. The impedance matching may be single-stage impedance matching shown in the figure, or multi-stage impedance matching, for example, three-stage impedance matching. In addition, the impedance matching may be connected to the end a shown in FIG. 9*a*.

Figure 9B:
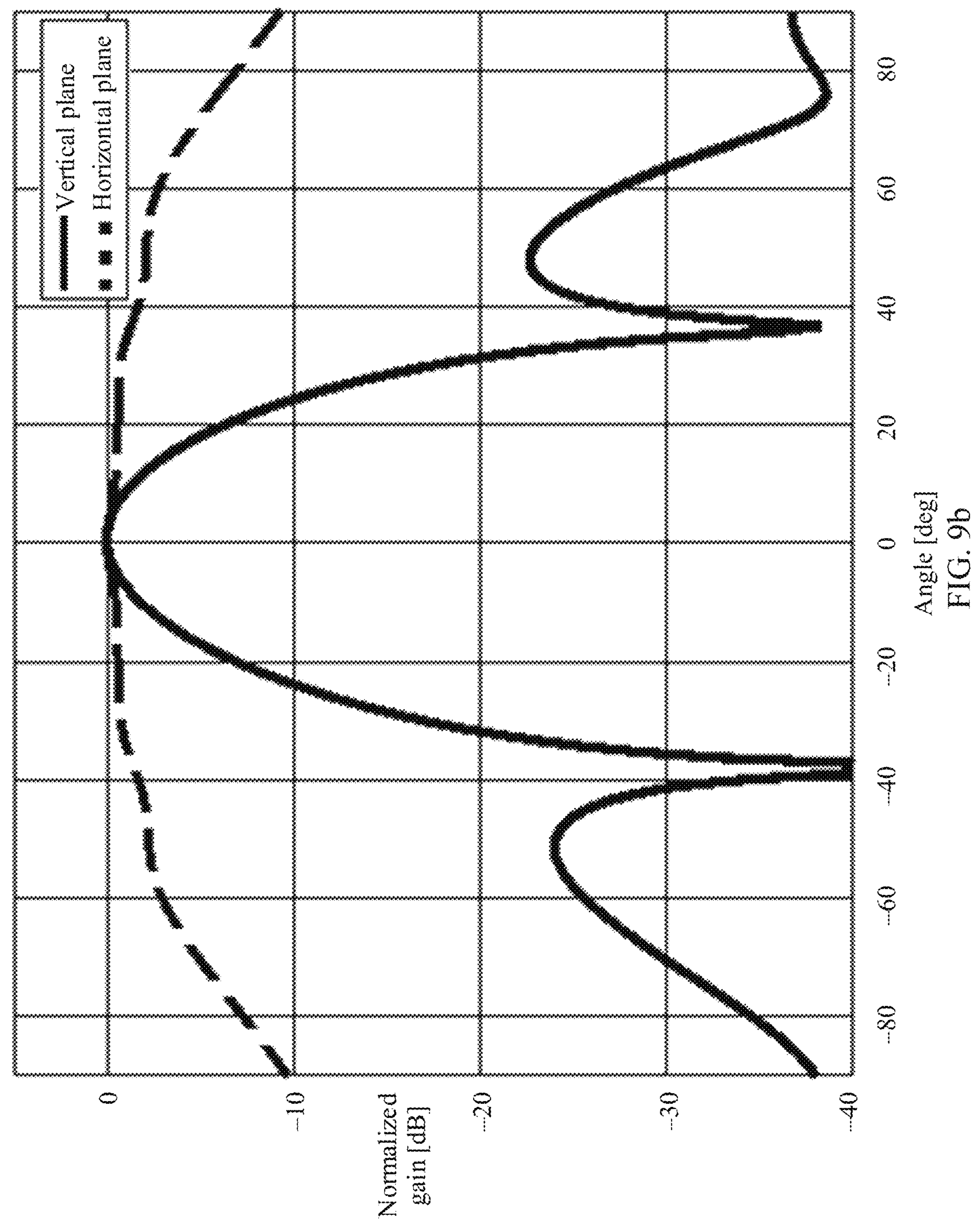
FIG. 9*b* is a simulation pattern of the antenna shown in FIG. 9*a*.

FIG. 9*b* is a simulation pattern of the antenna shown in FIG. 9*a*. The antenna shown in FIG. 9*a* may be obtained through fitting according to a polynomial function. It may be understood that widths of radiating elements of the antenna are distributed in a shape of a cone pin. It can be learned from FIG. 9*b* that, in a horizontal direction, that is, in a Y direction shown in FIG. 9*a*, a normalized gain is greater than −10 dB, an angle range may be from −85° to +85°, and a horizontal beam is excessively wide. In addition, in a vertical direction, that is, in an X direction shown in FIG. 9*a*, a maximum gain of a side lobe is only −23 dB. This implements low side lobes of a beam in the vertical direction. However, a gain of a side lobe of a broken-line antenna in the conventional technology is only about-15 dB. The antenna in this embodiment of this application greatly reduces energy of side lobes, and improves a radiation capability of a main lobe of the antenna. In addition, a width of the antenna in the Y direction is small, for example, less than a half operating wavelength. This implements miniaturization of the antenna and implements a wide beam characteristic of the antenna in the Y direction. The antenna may implement a bandwidth greater than 1 GHz, for example, 74 GHz to 81 GHz, with a reflection coefficient less than −10 dB, to implement a broadband characteristic of the antenna.

Optionally, one end of the antenna provided in this embodiment of this application may be short-circuited or open-circuited. For example, an end b is open-circuited.

Optionally, one end of the antenna provided in this embodiment of this application is connected to a matching load. For example, an end b is connected to a matching load. A shape of the matching load is not limited in this embodiment of this application.

Figure 10:
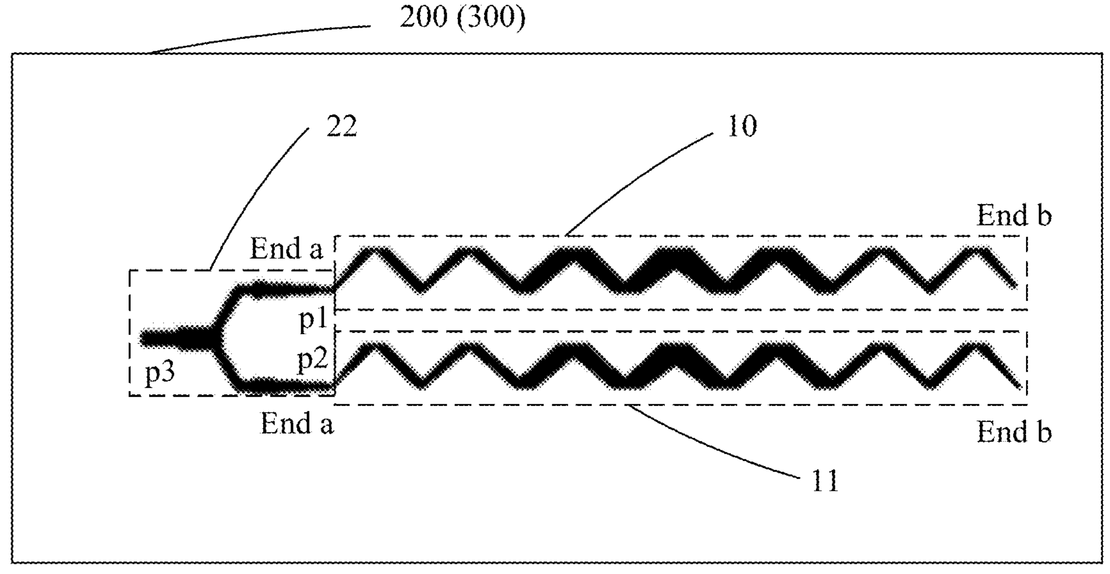
FIG. 10 is a schematic diagram of a structure of an antenna array according to an embodiment of this application.

An embodiment of this application further provides an antenna array. The antenna array may include the antenna in any one of the foregoing embodiments. In an embodiment, the antenna array may further include a power dividing and combining structure. FIG. 10 is a schematic diagram of a structure of an antenna array 20 according to an embodiment of this application. The antenna array 20 includes an antenna 10 and an antenna 11, and a power dividing and combining structure 22. The power dividing and combining structure 22 includes a first power-dividing end p1, a second power-dividing end p2, and a power-combining end p3. An end a of the antenna 10 is electrically connected to the first power-dividing end p1 of the power dividing and combining structure 22, and an end a of the second antenna 11 is electrically connected to the second power-dividing end p2 of the power dividing and combining structure 22. Therefore, a signal received on the antenna 10 and a signal received on the antenna 11 can be combined to the power-combining end p3. Alternatively, signals transmitted by the power-combining end p3 may be split to the antenna 10 and the antenna 11. In this way, a feeding network feeds the antenna array 20 in one-drive-two mode.

The power dividing and combining structure 22 shown in FIG. 10 is a one-to-two or two-in-one power dividing and combining structure. In an embodiment, the power dividing and combining structure 22 may be a one-to-many or all-in-one power dividing and combining structure, so that the feeding network feeds the antenna array in one-drive-many or all-in-one mode.

As shown in FIG. 10, the antenna 10 and the antenna 11 may share a same dielectric plate 200 and a same metal floor 300. In an embodiment, dielectric plates or metal floors of the antenna 10 and the antenna 11 may be separately designed. This is not limited in this embodiment of this application. In an embodiment, the antenna 10, the antenna 11, and the power dividing and combining structure 22 may be separately designed and then electrically connected, or may be directly integrated.

In an embodiment, a feeding manner of the antenna or the antenna array provided in this embodiment of this application may be end feeding, side feeding, or back feeding. In any one of the feeding manners of the end feeding, side feeding, or back feeding, feeding of the antenna or the antenna array may also be direct electrical connection feeding, for example, end feeding of direct connection feeding. Alternatively, in any one of the feeding manners of the end feeding, side feeding, or back feeding, feeding of the antenna or the antenna array may be coupled feeding, for example, side feeding of coupled feeding.

An embodiment of this application further provides a detection apparatus, including a radio frequency circuit and the antenna array provided in any one of the foregoing embodiments. The antenna or the antenna array is configured to receive or send a signal; and the radio frequency circuit is configured to process the signal. For example, the detection apparatus may be a radar. The antenna or the antenna array provided in this embodiment of this application is used in the radar, to improve distance resolution of the radar and reduce interference. In an embodiment, the radar may be a vehicle-mounted radar. In an embodiment, the detection apparatus may further include a protective cover. The protective cover is configured to protect the antenna and/or the radio frequency circuit, for example, to protect the antenna and/or the radio frequency circuit from dust and water.

An embodiment of this application further provides a terminal, including the detection apparatus provided in the foregoing embodiment. In an embodiment, the terminal may be a vehicle. When the detection apparatus is a radar, the vehicle carries the radar in this embodiment of this application. In this way, distance resolution of the detection apparatus can be improved, to improve a sensing capability of the vehicle. Optionally, the vehicle in this embodiment of this application may alternatively be an intelligent driving vehicle, a self-driving vehicle, or a vehicle integrated with an auxiliary driving function. The vehicle in this embodiment of this application may be replaced with another carrier or vehicle like a train, an aircraft, a robot, a slow-velocity transport vehicle, or a mobile platform.

The terminal provided in this embodiment of this application may alternatively be user equipment, an access terminal, a subscriber unit, a subscriber station, a mobile station, a mobile console, a remote station, a remote terminal, a mobile device, a user terminal, a terminal device, a wireless communication device, a user agent, or a user apparatus. The terminal device may also be a cellular phone, a cordless phone, a session initiation protocol (SIP) phone, a wireless local loop (WLL) station, a personal digital assistant (PDA), a handheld device with a wireless communication function, a computing device, another processing device connected to a wireless modem, another vehicle-mounted device, a wearable device, or a smart home device. This is not limited in this embodiment of this application. The antenna or the antenna array provided in embodiments of this application is used in another terminal device like a mobile phone, so that a bandwidth of an operating frequency band of the mobile phone can be improved, and an anti-interference capability of a signal of the mobile phone can be improved.

The foregoing descriptions are merely specific embodiments of this application, but are not intended to limit the protection scope of this application. Any variation or replacement, for example, reducing or adding a mechanical part, and changing a shape of a mechanical part, readily figured out by a person skilled in the art within the technical scope disclosed in this application shall fall within the protection scope of this application. When no conflict occurs, embodiments of this application and the characteristics in the embodiments may be mutually combined. Therefore, the protection scope of this application shall be subject to the protection scope of the claims.

What is claimed is:

1. An antenna, comprising:

a plurality of radiating elements that are sequentially connected, and an angle between adjacent radiating elements is greater than 0° and less than 180°; and the plurality of radiating elements comprise a first radiating element; and in a first direction, along a first side of the first radiating element, widths of radiating elements in the plurality of radiating elements gradually decrease, wherein an included angle between adjacent radiating elements that are not at both ends of the antenna is less than an included angle between adjacent radiating elements that are at both the ends of the antenna.

2. The antenna according to claim 1, wherein in the first direction, along a second side of the first radiating element, widths of radiating elements in the plurality of radiating elements gradually decrease.

3. The antenna according to claim 1, wherein the first radiating element is a radiating element with a largest width in the plurality of radiating elements.

4. The antenna according to claim 3, wherein the plurality of radiating elements further comprise a second radiating element, and the second radiating element is a radiating element with a smallest width in the radiating elements on the first side of the first radiating element; or the plurality of radiating elements further comprise a third radiating element, and the third radiating element is a radiating element with a smallest width in the radiating elements on the second side of the first radiating element.

5. The antenna according to claim 4, wherein the plurality of radiating elements further comprise:

at least one radiating element between the first radiating element and the second radiating element; or at least one radiating element between the first radiating element and the third radiating element.

6. The antenna according to claim 5, wherein a fourth radiating element is comprised between the first radiating element and the second radiating element or between the first radiating element and the third radiating element, and a width of the fourth radiating element is the same as a width of the first radiating element.

7. The antenna according to claim 6, wherein in addition to the fourth radiating element, a first quantity of radiating elements comprised between the second radiating element and the first radiating element is the same as a second quantity of radiating elements comprised between the first radiating element and the third radiating element or a difference between the first quantity of radiating elements comprised between the second radiating element and the first radiating element and the second quantity of radiating elements comprised between the first radiating element and the third radiating element is 1.

8. The antenna according to claim 6, wherein in addition to the fourth radiating element, a width of a radiating element between the first radiating element and the second radiating element is greater than or equal to a width of the second radiating element and is less than the width of the first radiating element; or a width of a radiating element between the first radiating element and the third radiating element is greater than or equal to a width of the third radiating element and is less than the width of the first radiating element.

9. The antenna according to claim 1, wherein a width of the first radiating element is non-uniform.

10. The antenna according to claim 1, wherein a width of each of the plurality of radiating elements is non-uniform.

11. The antenna according to claim 1, wherein a width of a radiating element in the plurality of radiating elements is a maximum width or an average width of a corresponding radiating element; or a width of a radiating element in the plurality of radiating elements is a width at a same reference position.

12. The antenna according to claim 1, wherein a maximum width of a radiating element in the plurality of radiating elements is less than or equal to 0.5 times an operating wavelength.

13. An antenna array, wherein the antenna array comprises a plurality of antennas, wherein an antenna comprises a plurality of radiating elements that are sequentially connected, and an angle between adjacent radiating elements is greater than 0° and less than 180°; and the plurality of radiating elements comprise a first radiating element; and in a first direction, along a first side of the first radiating element, widths of radiating elements in the plurality of radiating elements gradually decrease, wherein an included angle between adjacent radiating elements that are not at both ends of the antenna is less than an included angle between adjacent radiating elements that are at both the ends of the antenna.

14. The antenna array according to claim 13, wherein the antenna array further comprises a power dividing and combining circuit, wherein the power dividing and combining circuit comprises a first power-dividing end and a second power-dividing end that are respectively electrically connected to a first antenna and a second antenna in the plurality of antennas.

15. The antenna array according to claim 13, wherein in the first direction, along a second side of the first radiating element, widths of radiating elements in the plurality of radiating elements gradually decrease.

16. The antenna array according to claim 13, wherein the first radiating element is a radiating element with a largest width in the plurality of radiating elements.

17. The antenna array according to claim 16, wherein the plurality of radiating elements further comprise a second radiating element, and the second radiating element is a radiating element with a smallest width in the radiating elements on the first side of the first radiating element; or the plurality of radiating elements further comprise a third radiating element, and the third radiating element is a radiating element with a smallest width in the radiating elements on the second side of the first radiating element.

18. The antenna array according to claim 17, wherein the plurality of radiating elements further comprise:

at least one radiating element between the first radiating element and the second radiating element; or at least one radiating element between the first radiating element and the third radiating element.

19. The antenna array according to claim 18, wherein a fourth radiating element is comprised between the first radiating element and the second radiating element or between the first radiating element and the third radiating element, and a width of the fourth radiating element is the same as a width of the first radiating element.

20. The antenna array according to claim 19, wherein in addition to the fourth radiating element, a first quantity of radiating elements comprised between the second radiating element and the first radiating element is the same as a second quantity of radiating elements comprised between the first radiating element and the third radiating element or a difference between the first quantity of radiating elements comprised between the second radiating element and the first radiating element and the second quantity of radiating elements comprised between the first radiating element and the third radiating element is 1.

* * * * *